US012639137B2

(12) United States Patent
Doraiswamy

(10) Patent No.: US 12,639,137 B2
(45) Date of Patent: May 26, 2026

(54) ACTIONING SYSTEM FOR OBSERVABILITY PLATFORMS

(71) Applicant: Cisco Technology, Inc., San Jose, CA (US)

(72) Inventor: Mahesh Kumar Doraiswamy, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 491 days.

(21) Appl. No.: 18/304,072

(22) Filed: Apr. 20, 2023

(65) Prior Publication Data

US 2024/0354175 A1     Oct. 24, 2024

(51) Int. Cl.
    *G06F 9/54*      (2006.01)
    *G06F 8/61*      (2018.01)

(52) U.S. Cl.
    CPC ................ *G06F 9/542* (2013.01); *G06F 8/63* (2013.01)

(58) Field of Classification Search
    CPC .................................. G06F 9/542; G06F 8/63
    USPC ......................................................... 719/318
    See application file for complete search history.

(56) References Cited

U.S. PATENT DOCUMENTS

| | | | |
|---|---|---|---|
| 11,010,218 B1 | 5/2021 | Karaya | |
| 2011/0153590 A1 | 6/2011 | Chang et al. | |
| 2013/0080785 A1* | 3/2013 | Ruhlen ................... | H04L 67/51 |
| | | | 713/176 |
| 2013/0117337 A1* | 5/2013 | Dunham ............... | G06F 16/182 |
| | | | 707/827 |
| 2014/0365895 A1* | 12/2014 | Magahern ........... | G06F 3/04842 |
| | | | 715/762 |
| 2015/0373012 A1* | 12/2015 | Bartz ..................... | H04L 67/53 |
| | | | 715/738 |
| 2017/0006082 A1* | 1/2017 | Shishodia ............... | H04L 67/75 |
| 2017/0006119 A1* | 1/2017 | Pogrebinsky ......... | G06F 3/0482 |
| 2017/0104814 A1* | 4/2017 | Dias ........................ | H04L 67/02 |
| 2017/0264567 A1* | 9/2017 | Shetty .................... | H04L 67/10 |
| 2018/0232259 A1* | 8/2018 | Chowdhury .......... | G06F 9/4881 |
| 2019/0205184 A1 | 7/2019 | Zhang et al. | |
| 2020/0012545 A1 | 1/2020 | Zhang et al. | |

(Continued)

OTHER PUBLICATIONS

GITHUB, "OAI/OpenAPI—Specification: The OpenAPI Specification Repository," retrieved from https://github.com/OAI/OpenAPI-Specification, on Apr. 27, 2021, 4 pages.

*Primary Examiner* — Tuan C Dao
(74) *Attorney, Agent, or Firm* — Edell, Shapiro & Finnan, LLC

(57)     ABSTRACT

Methods and systems provide smart actioning by augmenting open application programming interface data with cloud event definitions to generate a serverless workflow which executes in a cloud native environment to perform required orchestrations to external systems. These methods involve obtaining data describing an open application programming interface that includes one or more cloud event definitions and application programming interface calls for integrating with an external system and generating at least one serverless workflow based on the one or more cloud event definitions. The at least one serverless workflow executes in a cloud native environment. These methods further involve deploying the at least one serverless workflow in the cloud native environment for integration with the external system.

20 Claims, 5 Drawing Sheets

<u>400</u>

(56) References Cited

U.S. PATENT DOCUMENTS

| | | | |
|---|---|---|---|
| 2020/0014604 A1* | 1/2020 | Smith | H04L 41/18 |
| 2020/0021519 A1* | 1/2020 | Schneider | H04L 45/74 |
| 2020/0045021 A1* | 2/2020 | Martin | H04L 9/30 |
| 2020/0142712 A1 | 5/2020 | Liu et al. | |
| 2020/0409369 A1* | 12/2020 | Zaytsev | G06F 11/3696 |
| 2020/0412763 A1* | 12/2020 | Mercian | H04L 63/101 |
| 2021/0132947 A1 | 5/2021 | John et al. | |
| 2021/0200527 A1* | 7/2021 | Sanchez | G06F 8/65 |
| 2021/0200596 A1* | 7/2021 | Sanchez | G06F 9/5038 |
| 2021/0216369 A1* | 7/2021 | Jain | G06F 9/5005 |
| 2022/0374434 A1* | 11/2022 | Nash | G06F 16/24568 |
| 2022/0391227 A1* | 12/2022 | Grigore | G06F 9/45558 |
| 2023/0176877 A1* | 6/2023 | Heimler | G06F 9/541 |
| | | | 713/1 |
| 2024/0111588 A1* | 4/2024 | Wei | G06F 9/4837 |

* cited by examiner

/posts:
get:
    description: Returns all posts
    tags: ["Posts"]
    operationId: "getPosts"
    x-action: ～ 212
        tags: ["Workflow1"] ～ 214
        sequence: [1] ～ 216
        event-name: postsEvent ～ 218
        event-source: /example/postsEvent ～ 220
        event-type: com.example.postsEvent ～ 222
    responses:
        "200":
            description: Successful response
            content:
                "application/json":
                    schema:
                        $ref: "#/components/schemas/PostsList"

202

210

204

200

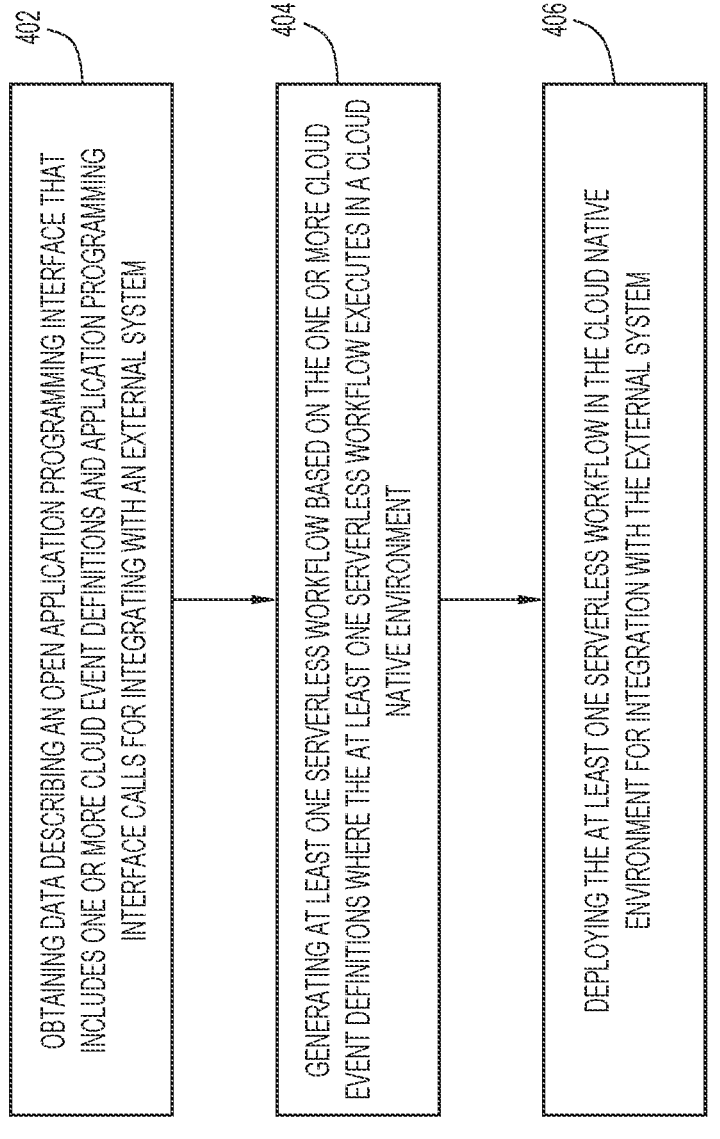

OBTAINING DATA DESCRIBING AN OPEN APPLICATION PROGRAMMING INTERFACE THAT INCLUDES ONE OR MORE CLOUD EVENT DEFINITIONS AND APPLICATION PROGRAMMING INTERFACE CALLS FOR INTEGRATING WITH AN EXTERNAL SYSTEM
402

GENERATING AT LEAST ONE SERVERLESS WORKFLOW BASED ON THE ONE OR MORE CLOUD EVENT DEFINITIONS WHERE THE AT LEAST ONE SERVERLESS WORKFLOW EXECUTES IN A CLOUD NATIVE ENVIRONMENT
404

DEPLOYING THE AT LEAST ONE SERVERLESS WORKFLOW IN THE CLOUD NATIVE ENVIRONMENT FOR INTEGRATION WITH THE EXTERNAL SYSTEM
406

ACTIONING SYSTEM FOR OBSERVABILITY PLATFORMS

TECHNICAL FIELD

The present disclosure generally relates to computer networks and systems.

BACKGROUND

Network architectures have grown increasingly complex. Moreover, enterprise networks are deployed in unknown networking environments and are often, in a cloud. Monitoring, provisioning, and managing these enterprise networks are becoming increasingly cumbersome. Observability platforms are often used for managing, configuring, and troubleshooting enterprise networks. Observability platforms integrate with external systems to perform these tasks. A common use case is to perform actions on external systems (e.g., ticketing system) when an event such as a violation of health rules or an anomaly is detected. The actions are typically static Hypertext Transfer Protocol (HTTP) Restful Application Programing Interface (REST API) calls, sending an email, etc.

BRIEF DESCRIPTION OF THE DRAWINGS

FIG. 4 is a flowchart illustrating a method of deploying at least one serverless workflow in a cloud native environment for integration with an external system, according to an example embodiment.

DESCRIPTION OF EXAMPLE EMBODIMENTS

Overview

Briefly, methods are presented for smart actioning in which serverless orchestration workflows are generated using predefined cloud event definitions. The cloud event definitions are defined as extensions to data that describes open application programming interface (API) i.e., open API calls. The serverless workflows are deployed in cloud native environments for integration with external systems.

A method is provided that includes obtaining data describing an open application programming interface that includes one or more cloud event definitions and application programming interface calls for integrating with an external system. The method further includes generating at least one serverless workflow based on the one or more cloud event definitions. The at least one serverless workflow executes in a cloud native environment. The method further involves deploying the at least one serverless workflow in the cloud native environment for integration with the external system.

Example Embodiments

As noted above, observability platforms make static HTTP REST API calls to external systems when an event such as a health rule violation occurs. These actions, however, are not enough to perform complex change remediations and/or peer application integrations. Additionally, a high touch customization is needed to define templates based on individual endpoint devices of an enterprise network and/or an external system.

Change remediations and/or application integrations in cloud native environments are primarily event driven and often involve a sequence of API calls, decisions, etc. Techniques are needed to leverage industry standards, provide a low code integration experience, and to adapt to cloud native practices. Techniques are needed that avoid high touch customization that is required for each individual enterprise network or for each external system.

The techniques presented herein provide a smart actioning system that generates serverless orchestration workflows using predefined cloud event definitions. The cloud event definitions are provided as extensions in an open application programming interface (OpenAPI) specification (specs). Techniques provide for low code integration in cloud native environments to perform orchestration with external system (s). The OpenAPI specifications (or data that describes the open API) are augmented with cloud event definitions. These OpenAPI specifications are used to generate serverless workflows that execute in cloud native environments. The serverless workflows perform the required orchestration to external systems. Thus, high touch customization for peer application integrations is simplified. Moreover, the smart actioning system is aligned with industry standards and cloud native practices. Further, the smart actioning system simplifies developer experience in building outbound integrations with observability platforms.

Figure 1:
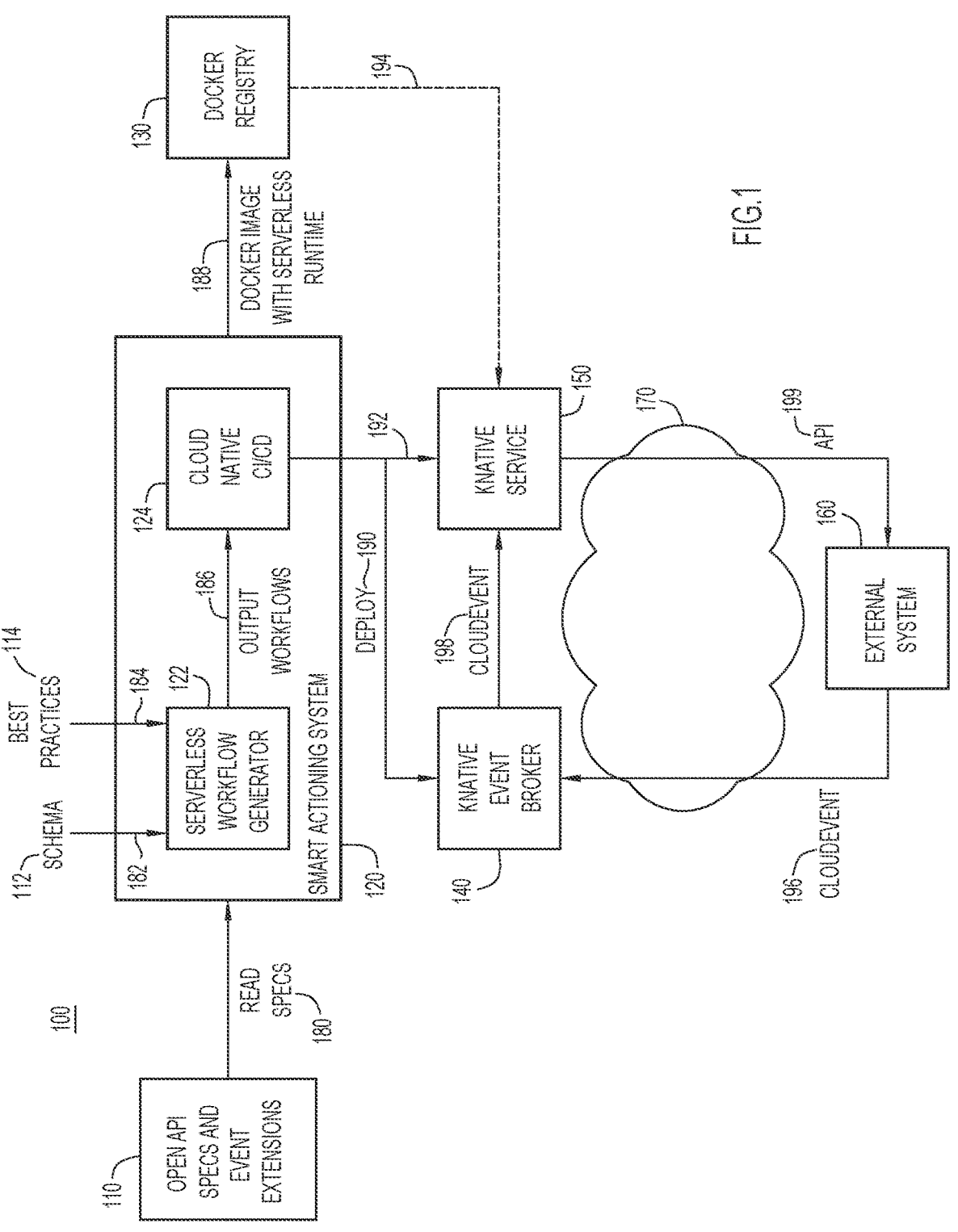
FIG. 1 is a diagram illustrating an environment in which of a smart actioning system is deployed, according to an example embodiment.

FIG. 1 is a diagram illustrating an environment 100 in which of a smart actioning system 120 is deployed, according to an example embodiment. The environment 100 involves data such as open API specification and event extensions 110, schema 112, and best practices 114. Data is obtained by the smart actioning system 120 that is executing on one or more computing devices (e.g., servers). The environment 100 further includes a docker registry 130, a KNative event broker 140, a KNative service 150, an external system 160, and a network 170. This is an example of the environment 100 and number of entities and types vary based on a particular deployment and use case scenario.

The entities (nodes, network devices, computing devices, systems, services, etc.) of the environment 100 communicate via the one or more networks such as the network 170. While only the network 170 is depicted in FIG. 1, it is understood that the smart actioning system 120 communicates with other entities and obtains various data such as the open API specification and event extensions 110, the schema 112, and the best practices 114 via one or more networks and the network 170 is just one example of the networks used for communication by various entities of the environment 100. The one or more networks may include a local area network (LAN), a wide area network (WAN) such as the Internet, or a combination thereof, and includes wired, wireless, or fiber optic connections. In general, the one or more networks can use any combination of connections and protocols that support communications between the entities of the environment 100.

In various example embodiments, the entities of the environment 100 (the smart actioning system 120, the docker registry 130, the KNative event broker 140, the KNative service 150, and the external system 160) may each include a network interface, at least one processor, and a memory. Each entity may be any programmable electronic device capable of executing computer readable program instructions. The network interface may include one or more network interface cards that enable components of the entity to send and receive data over the one or more networks such as the network 170. Each entity may include internal and external hardware components such as those depicted and described in further detail in FIG. 5.

The open API specification and event extensions 110 is data that describes API calls that the external system 160 understands. The API calls may be simple REST API calls. In one example, the open API specification and event extensions 110 define a standard or a programming language-agnostic interface that allows for discovery of capabilities of a service without requiring access to the source code, etc. Some non-limiting examples of the API calls include get, post, put, patch, delete, fetch, and/or to-do items.

In one or more example embodiments, the data that describes open API calls is augmented with one or more cloud event definitions for integrating with the external system 160. In particular, the data includes "x-action" extensions that define cloud events for various serverless workflows. In the x-action extensions, a serverless workflow to be generated is defined with various states (using sequence identifiers), and events that trigger the next state e.g., a name of the event, a source of the event, and/or a type of the event. The last sequence number maps to an end state of the respective workflow.

The data obtained by the smart actioning system 120 further includes the schema 112 and the best practices 114. The schema 112 is a template or metadata that describes the structure of the open API specification and event extensions 110. Schema 112 are instructions regarding how to read the open API specification and event extensions 110. For example, the schema 112 provides a model to interpret and transform the Open API specification to serverless workflows. The API calls to invoke are obtained from the Open API specification. The best practices 114 include preferred or suggested limits, terms, constraints, and/or conditions. For example, the best practices 114 may include a limit on how many times to repeat an API call when the external system 160 is not operational or nonresponsive. As another example, the best practices 114 may include a timeout such as if the external system 160 does not respond within five minutes time limit, stop the integration process.

The smart actioning system 120 is configured to generate at least one serverless workflow based on the one or more cloud event definitions in the open API specification and event extensions 110. The serverless workflow is transformed into an executable service that may be deployed by the KNative event broker 140 and the KNative service 150. The executable service may be stored in one or more datastores such as the docker registry 130 for a later deployment.

The smart actioning system 120 includes a serverless workflow generator 122 and a cloud native continuous integration (CI)/continuous delivery component (i.e., a cloud native CI/CD 124).

The serverless workflow generator 122 obtains data that describes the open API (e.g., the open API specification and event extensions 110), the schema 112, and the best practices

114. The serverless workflow generator 122 applies the schema 112 and the best practices 114 to generate a cloud native computing foundation (CNCF) serverless workflow data based on or using the open API specification and event extensions 110. The CNCF serverless workflow data defines one or more actions to be performed on the external system 160 based on an occurrence of one or more events. For example, the CNCF serverless workflow data includes one or more states (that are triggered by various events occurring in the external system 160) and operations that are to be performed at each state. The operations may include, but are not limited to, API calls to post, get posts, perform to-do items, perform integration with ticketing systems, network controllers, etc., and/or obtain telemetry data or metric values from the external system 160.

The cloud native CI/CD 124 is a bridge that transforms the CNCF serverless workflow data into one or more executable services to be deployed by services such as the KNative event broker 140 and/or the KNative service 150, which integrate with the external system 160. In one example embodiment, the cloud native CI/CD 124 generates an executable service such as a docker image or a container that orchestrates or provisions the external system 160 (using states and operations defined in the executable service).

The docker registry 130 is a database or a datastore that stores one or more executable services (e.g., workflows) for the external system 160. The docker registry 130 is a memory that may be external to the other entities of the environment 100. The entities of the environment 100 may communicate with the docker registry 130 via one or more networks such as the network 170. In one example embodiment, the docker registry 130 stores docker images with serverless runtime.

The KNative event broker 140 and the KNative service 150 are components that deploy, run, and manage serverless, cloud-native applications or services to Kubernetes. The KNative event broker 140 is configured to receive and process cloud events from the external system 160. The KNative event broker 140 informs the KNative service 150 of an occurred event(s) in the external system 160. The KNative service 150 generates external API calls triggered by the event(s). The event(s) may serve as trigger for the executable service to proceed to the next state and perform a different API call.

The external system 160 may be an enterprise network that is being monitored but this is just an example. The external system 160 may be any system such as a network troubleshooting system, a network ticketing system, a network management system, a network controller, etc. The external system 160 may include any number of network devices and/or other computing resources/devices. The external system 160 may be a data center deployed in a cloud and/or that includes a central office and a variety of physically remote sites. The external system 160 may be any 3rd party system whose deployment whereabouts may be unknown.

While in this disclosure only the external system 160 is shown, the disclosure is not limited thereto. There may be many external systems for which the smart actioning system 120 generates various serverless workflows and there may be various event brokers and services that connect to or integrate with various external systems for provisioning, remediation actions, etc.

In the environment 100, at 180, the serverless workflow generator 122 obtains and reads data that describes the open API calls and that defines cloud events (specs) i.e., the open API specification and event extensions 110. At 182, the serverless workflow generator 122 obtains the schema 112 and (optionally, at 184, data that describes the best practices 114).

At 186, the serverless workflow generator 122 outputs serverless workflows to the cloud native CI/CD 124. Specifically, the serverless workflow generator 122 applies the schema 112 and the best practices 114 to the data that describes the open API calls and that defines the cloud events, to generate serverless workflows therefrom.

The cloud native CI/CD 124 generates an executable service i.e., a docker image and at 188, provides the docker image with serverless runtime for storage to the docker registry 130.

The cloud native CI/CD 124 deploys the executable service such as docker images. Specifically, at 190, the serverless workflow is deployed at the KNative event broker 140 and at 192, the serverless workflow is deployed at the KNative service 150. In one example embodiment, at 194, the docker registry 130 may store the docker image as the KNative service 150 and the KNative event broker 140.

At 196, the KNative event broker 140 obtains a notification about an occurrence of a cloud event in the external system 160. At 198, the KNative event broker 140 notifies the KNative service 150 about the occurrence of the cloud event. The cloud event serves as a trigger for the KNative service 150 to execute certain actions such as one or more API calls to the external system 160, at 199. The cloud event may further trigger the serverless workflow to transition to the next state to perform a different operation with the external system 160.

Figure 2:
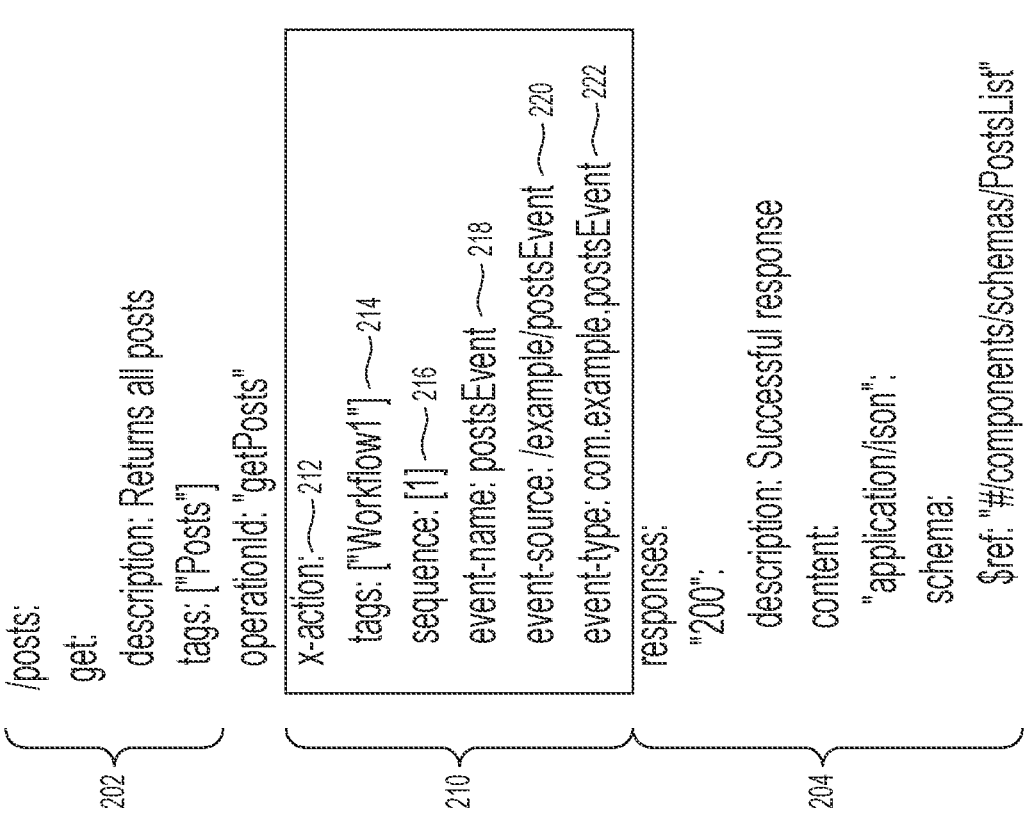
FIG. 2 is a view illustrating data describing an open application programming interface that includes a cloud event definition and an API call for integrating with an external system, according to an example embodiment.

With continued reference to FIG. 1, FIG. 2 is a view illustrating data 200 that describes an open application programming interface including a cloud event definition and an API call for integrating with an external system such as the external system 160 of FIG. 1, according to an example embodiment. The data 200 is one example of a portion of the open API specification and event extensions 110 of FIG. 1. A user may provide the data 200 for integration with their respective external system(s). The data 200 includes an API call 202 and an x-action extension 210 with a cloud event definition.

The API call 202 typically includes a unique operation that is a combination of path (a resource) and a method (e.g., HTTP method) such as fetch, post, put, etc. The API call 202 is an operation for returning all posts from the external system. The API call 202 may further specify the arguments to be applied. The API call 202 may also include expected responses such as a response schema 204. That is, the API call 202 may request a response e.g., HTTP "200" OK (success status response code to indicate that the operation has succeeded).

The data 200 is mapped and extended to generate CNCF serverless workflow data using "x-action" extensions (the x-action extension 210). Event definition maps to Cloud Event specifications. The x-action extension 210 includes an extension identifier 212, one or more tags 214 (unique tags), sequence number(s) 216, an event name 218, an event source 220, and an event type 222.

The extension identifier 212 indicates that the extension is an event defining extension i.e., the x-action extension 210. The one or more tags 214 uniquely identify a respective workflow in which this event occurs and a respective state triggered by the event using the sequence number(s) 216. That is, each unique tag discovered creates a serverless workflow. For example, the one or more tags 214 indicate that the event will occur in the "Workflow1" and that this event triggers is the first state in the workflow (i.e., the sequence number(s) 216 is "1") or the next state in the workflow (i.e., the sequence number(s) 216 is "2").

Each event in the serverless workflow includes the event name 218, the event source 220, and the event type 222. For example, the event name 218 is "postsEvent", the event source 220 is "/example/postsEvent" (indicating the resource involved), and the event type 222 is "com.example-.postsEvent". That is, each "x-action" tagged resource creates a function in the serverless workflow. Each of the event name 218 creates an event in the serverless workflow. The event name 218 maps to a cloud event defined in the data 200. Each of the sequence number(s) 216 creates a state in the serverless workflow with the last sequence number being a unique tag that maps to the end state of the serverless workflow.

Providing, to the serverless workflow generator 122, the data 200 augmented with cloud event definitions as extensions, allows the serverless workflow generator 122 to automatically generate CNCF serverless workflow specification/data that integrates with an external system in a cloud environment. The integration may involve monitoring or obtaining various telemetry data or metric values (observability). The integration may involve performing actions with respect to the external system without high customization or coding by the operator/user. Thus, the smart actioning system 120 may save time and costs involved in the integration with external systems and may avoid human errors that may occur during development of the code for integration.

Figure 3:
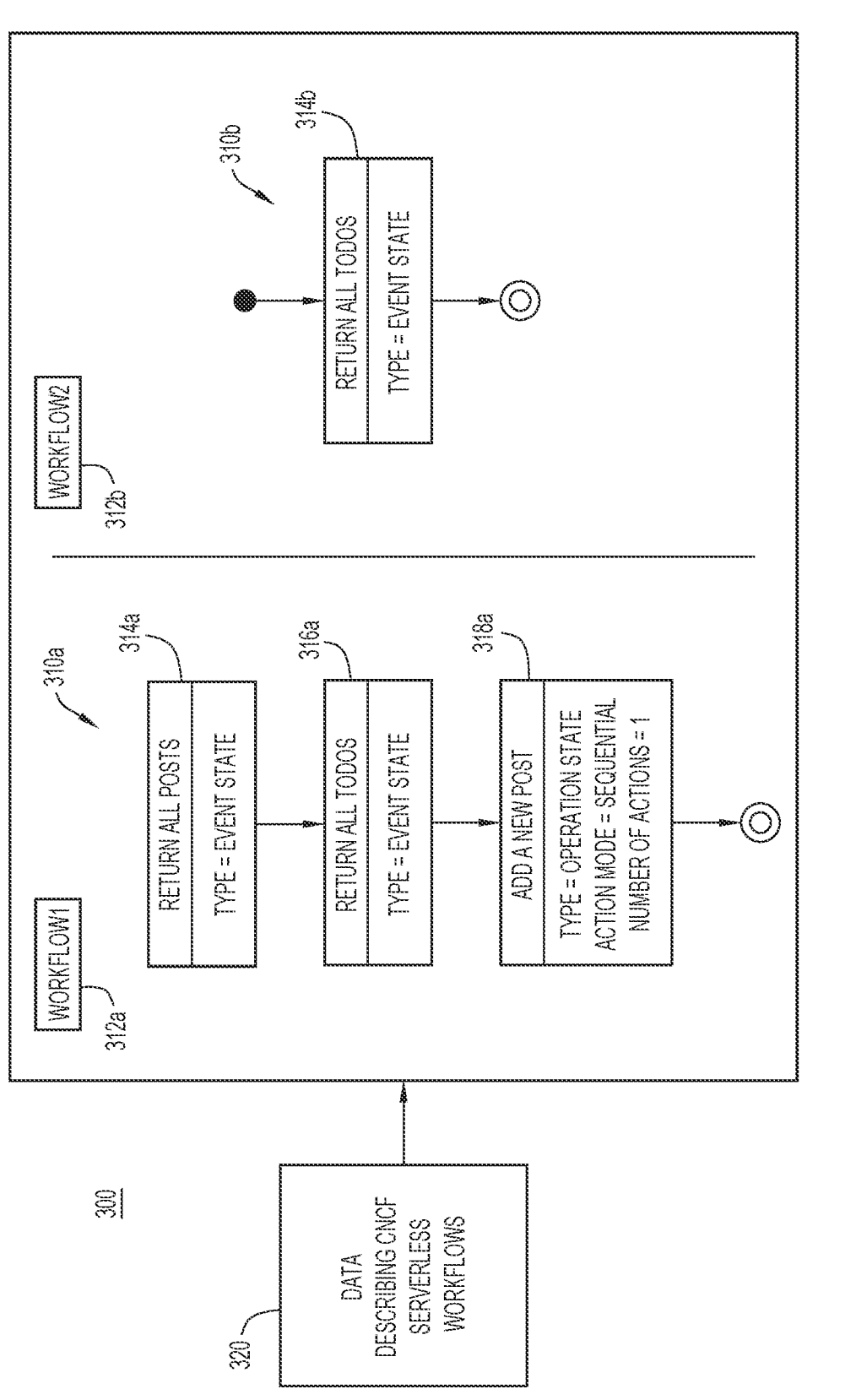
FIG. 3 is a view illustrating serverless workflows generated using a cloud native computing foundation (CNCF) serverless workflow data generated from data describing an open application programming interface, according to an example embodiment.

With continued reference to FIGS. 1 and 2, FIG. 3 is a view illustrating serverless workflows 300 generated using data 320 describing CNCF serverless workflow, which is generated from data describing open API, according to an example embodiment. The serverless workflows 300 include a first workflow 310a and a second workflow 310b.

The notations 1, 2, 3, . . . n; a, b, c, . . . n; "a-n", "a-b", and the like illustrate that the number of elements can vary depending on a particular implementation and is not limited to the number of elements being depicted or described. Moreover, this is only examples of various components and/or serverless workflows, and the number and types of components, functions, serverless workflows, etc. may vary based on a particular deployment and use case scenario.

Data describing Open API may be the open API specification and event extensions 110 of FIG. 1 and/or the data 200 of FIG. 2. Another example of the data describing Open API is provided on the left-hand side of the table below.

An example of the data 320 describing CNCF serverless workflow is provided on the right-hand side of the table below.

| Data describing Open API | Data describing CNCF Serverless workflow (Generated) |
| --- | --- |
| openapi: 3.0.0 | --- |
| info: | id: Workflow1 |

| Data describing Open API | Data describing CNCF Serverless workflow (Generated) |
|---|---|
| version: 1.0.0<br>title: JSON Placeholder API<br>description: See<br>https://jsonplaceholder.typicode.com/<br>servers:<br> - "url" :<br>"https://jsonplaceholder.typicode.com/"<br>  "description": "JSON placeholder"<br>paths:<br> /posts:<br>  get:<br>   description: Returns all posts<br>   tags: ["Posts"]<br>   operationId: "getPosts"<br>   x-action:<br>    tags: ["Workflow1"]<br>    sequence: [1]<br>    event-name: postsEvent<br>    event-source: /example/postsEvent<br>    event-type: com.example.postsEvent<br>   responses:<br>    "200":<br>     description: Successful response<br>     content:<br>      "application/json":<br>       schema:<br>        $ref:<br>"#/components/schemas/PostsList"<br>  post:<br>   description: Add a new post<br>   requestBody:<br>    required: true<br>    content:<br>     application/json:<br>      schema:<br>       $ref: '#/components/schemas/Post'<br>   x-action:<br>    tags: ["Workflow1"]<br>    sequence: [3]<br>    arguments:<br>     id: ${ .post_id }<br>     userId: ${ .post_user_id }<br>     title: ${ .post_title }<br>     body: ${ .post_body }<br>   responses:<br>    "201":<br>     description: Created<br>     content:<br>      "application/json":<br>       schema:<br>        $ref:<br>"#/components/schemas/Post"<br> /todos:<br>  get:<br>   description: Returns all todos<br>   tags: ["Todos"]<br>   operationId: "getTodos"<br>   x-action:<br>    tags: ["Workflow1", "Workflow2"]<br>    sequence: [2, 1]<br>    event-name: todosEvent<br>    event-source: /example/todosEvent<br>    event-type: com.example.todosEvent<br>   responses:<br>    "200":<br>     description: Successful response<br>     content:<br>      "application/json":<br>       schema:<br>        $ref:<br>"#/components/schemas/TodoList"<br>  post:<br>   description: Add a new todo<br>   requestBody:<br>    required: true<br>    content: | name: Workflow1<br>version: '1.0'<br>description: Workflow1<br>start: Return all posts<br>events:<br>- name: postsEvent<br> type: com.example.postsEvent<br> source: "/example/postsEvent"<br>- name: todosEvent<br> type: com.example.todosEvent<br> source: "/example/todosEvent"<br>functions:<br>- name: getPosts<br> type: rest<br> operation: openapi/json-placeholder-<br>api.yaml#getPosts<br>- name: getTodos<br> type: rest<br> operation: openapi/json-placeholder-<br>api.yaml#getTodos<br>- name: createPost<br> type: rest<br> operation: openapi/json-placeholder-<br>api.yaml#createPost<br>states:<br>- name: Return all posts<br> type: event<br> onEvents:<br> - eventRefs:<br>  - postsEvent<br>  actionMode: sequential<br>  actions:<br>  - name: getPosts<br>   functionRef:<br>    refName: getPosts<br> transition:<br>  nextState: Return all todos<br>- name: Return all todos<br> type: event<br> onEvents:<br> - eventRefs:<br>  - todosEvent<br>  actionMode: sequential<br>  actions:<br>  - name: getTodos<br>   functionRef:<br>    refName: getTodos<br> transition:<br>  nextState: Add a new post<br>- name: Add a new post<br> type: operation<br> actionMode: sequential<br> actions:<br> - name: createPost<br>  functionRef:<br>   refName: createPost<br>   arguments:<br>    id: ${ .post_id }<br>    userId: ${ .post_user_id }<br>    title: ${ .post_title }<br>    body: ${ .post_body }<br> end: true<br>---<br>id: Workflow2<br>name: Workflow2<br>version: '1.0'<br>description: Workflow2<br>start: Return all todos<br>events:<br>- name: todosEvent<br> type: com.example.todosEvent<br> source: "/example/todosEvent"<br>functions:<br>- name: getTodos<br> type: rest<br> operation: openapi/json-placeholder- |

-continued

| Data describing Open API | Data describing CNCF Serverless workflow (Generated) |
|---|---|
| application/json:<br>  schema:<br>    $ref: '#/components/schemas/Todo'<br>  responses:<br>   "201":<br>    description: Created<br>    content:<br>      "application/json":<br>      schema:<br>        $ref:<br>"#/components/schemas/Todo"<br>components:<br> schemas:<br>  PostsList:<br>   "type": "array"<br>   "items":<br>    $ref: "#/components/schemas/Post"<br>  Post:<br>   "type": "object"<br>   "required":<br>    - "id"<br>    - "userId"<br>    - "title"<br>    - "completed"<br>   "properties":<br>    id:<br>      type: "integer"<br>    userId:<br>      type: "integer"<br>    title:<br>      type: "string"<br>    completed:<br>      type: "string"<br>  TodoList:<br>   "type": "array"<br>   "items":<br>    $ref: "#/components/schemas/Todo"<br>  Todo:<br>   "type": "object"<br>   "required":<br>    - "id"<br>    - "userId"<br>    - "title"<br>    - "completed"<br>   "properties":<br>    id:<br>      type: "integer"<br>    userId:<br>      type: "integer"<br>    title:<br>      type: "string"<br>    completed:<br>      type: "string" | api.yaml#getTodos<br>states:<br>- name: Return all todos<br>  type: event<br>  onEvents:<br>  - eventRefs:<br>   - todosEvent<br>   actionMode: sequential<br>  actions:<br>  - name: getTodos<br>   functionRef:<br>    refName: getTodos<br>  end: true |

The data 320 describing the CNCF serverless workflow (right-hand side of the table above) is generated based on "x-action" extensions in the data describing OpenAPI (left-hand side of the table above). Each "sequence" creates a state in the data 320 describing CNCF serverless workflow (e.g., first state, next state, end state). One action may apply to multiple workflows but in different states (e.g., state 2 of workflow 1 and state 1 of workflow 2). The action in these states may be to perform an operation X by a resource Y (get all todos). The data 320 describing CNCF serverless workflow includes a name, a unique identifier or a unique tag, and a description of the serverless workflow to be generated. In short, the data 320 describing CNCF serverless workflow includes start and end events obtained from the x-action extensions, functions, operations, states of the workflow, and/or transitions (triggering events).

The serverless workflows 300 are generated by applying the data 320 describing the CNCF serverless workflow. The serverless workflows 300 include a first workflow 310a and a second workflow 310b. The first workflow 310a includes three states in which operations of return all posts, return all todos, and add a new post are performed. The second workflow 310b includes only one state in which all todos are returned. Last sequence number is a specific tag (a unique tag) that is mapped to the end state.

In one example, the first workflow 310a is defined with a first tag 312a "Workflow 1" and the second workflow 310b is defined with a second tag 312b "Workflow 2".

The first workflow 310a includes three states based on the specified sequences in the data 320 describing CNCF serverless workflow. In the first state 314a (the starting state), the first workflow 310a obtains all posts from an external system. Once this operation is complete, the first workflow 310a transitions to the next state, i.e., a second state 316a. In the second state 316a, the first workflow 310a obtains all todos from the external system. When this operation is completed (e.g., response OK "200"), the first workflow 310a transitions to a third state 318a in which it adds a new post to the external system. These operations are event driven such that the first workflow 310a transitions to the next state based on a triggering event. The second workflow 310b has only one state 314b in which all todos are obtained from the external system.

Referring back to FIG. 1, the serverless workflow generator 122 generates data describing CNCF serverless workflows based on data describing OpenAPI which includes, as extensions, definitions of cloud events. The serverless workflow generator 122 also leverages workflow best practices (e.g., timeouts, retries, etc.) and schemas to generate orchestration type CNCF serverless workflows. The cloud native CI/CD 124 transforms the CNCF serverless workflows into executable services such as docker images. Further, the cloud native CI/CD 124 leverages or applies run-time to execute the serverless workflows 300 of FIG. 3. The cloud native CI/CD 124 deploys the KNative service 150 that makes external API calls to the external system 160 and that receives events via the KNative event broker 140 using the CloudEvent format for the events.

The techniques presented herein augment data describing OpenAPI with cloud event definitions. This data is applied to generate CNCF serverless workflows which execute in cloud native environments to perform the required orchestration to external systems. This simplifies high touch customization for peer application integrations and is more aligned with industry standards and cloud native practices. The techniques presented herein may simplify the overall user experience in building outbound integrations with an observability platform that collects telemetry data and performs various remediations.

FIG. 4 is a flow diagram illustrating a method 400 of deploying at least one serverless workflow in a cloud native environment for integration with an external system, according to an example embodiment. The method 400 may be implemented by a smart actioning system 120 of FIG. 1 in combination with the docker registry 130, the KNative event broker 140, and/or the KNative service 150. The external system may be the external system 160 of FIG. 1. The method 400 may involve various data such as open API specification and event extensions 110 of FIG. 1, schema 112 and/or best practices 114 of FIG. 1.

At 402, the method 400 involves obtaining data describing an open application programming interface that includes one or more cloud event definitions and application programming interface calls for integrating with an external system.

At 404, the method 400 involves generating at least one serverless workflow based on the one or more cloud event definitions. The at least one serverless workflow executes in a cloud native environment.

At 406, the method 400 involves deploying the at least one serverless workflow in the cloud native environment for integration with the external system.

In one form, in the method 400, each of the one or more cloud event definitions may include at least one of: a unique tag that defines a respective workflow of the at least one serverless workflow, at least one sequence identifier which defines a state of the respective workflow, a name of an event which defines the event of the respective workflow that triggers next state in the respective workflow, a source of the event, and a type of the event.

In another form, in the method 400, each of the one or more cloud event definitions may be defined as an x-action extension in the data describing the open application programming interface. The method 400 may involve an x-action tagged resource that generates a function in the at least one serverless workflow.

According to one or more example embodiments, the operation 404 of generating the at least one serverless workflow may include obtaining at least one schema and applying the at least one schema to generate a cloud native computing foundation (CNCF) serverless workflow data based on the data describing the open application programming interface. The operation 404 of generating the at least one serverless workflow may further include generating the at least one serverless workflow based on the CNCF serverless workflow data. The at least one serverless workflow may be configured to perform one or more of: executing an action with respect to the external system, or obtaining telemetry data from the external system.

In one instance, the method 400 may further include generating a docker image based on the at least one serverless workflow and storing, in a docker registry, the docker image.

According to one or more example embodiments, the method 400 may further include generating at least one service for integrating with the external system based on the docker image.

In the method 400, the operation 406 of deploying the at least one serverless workflow may include executing at least one service that performs at least one application programming interface call to the external system and that obtains at least one event from the external system.

Figure 5:
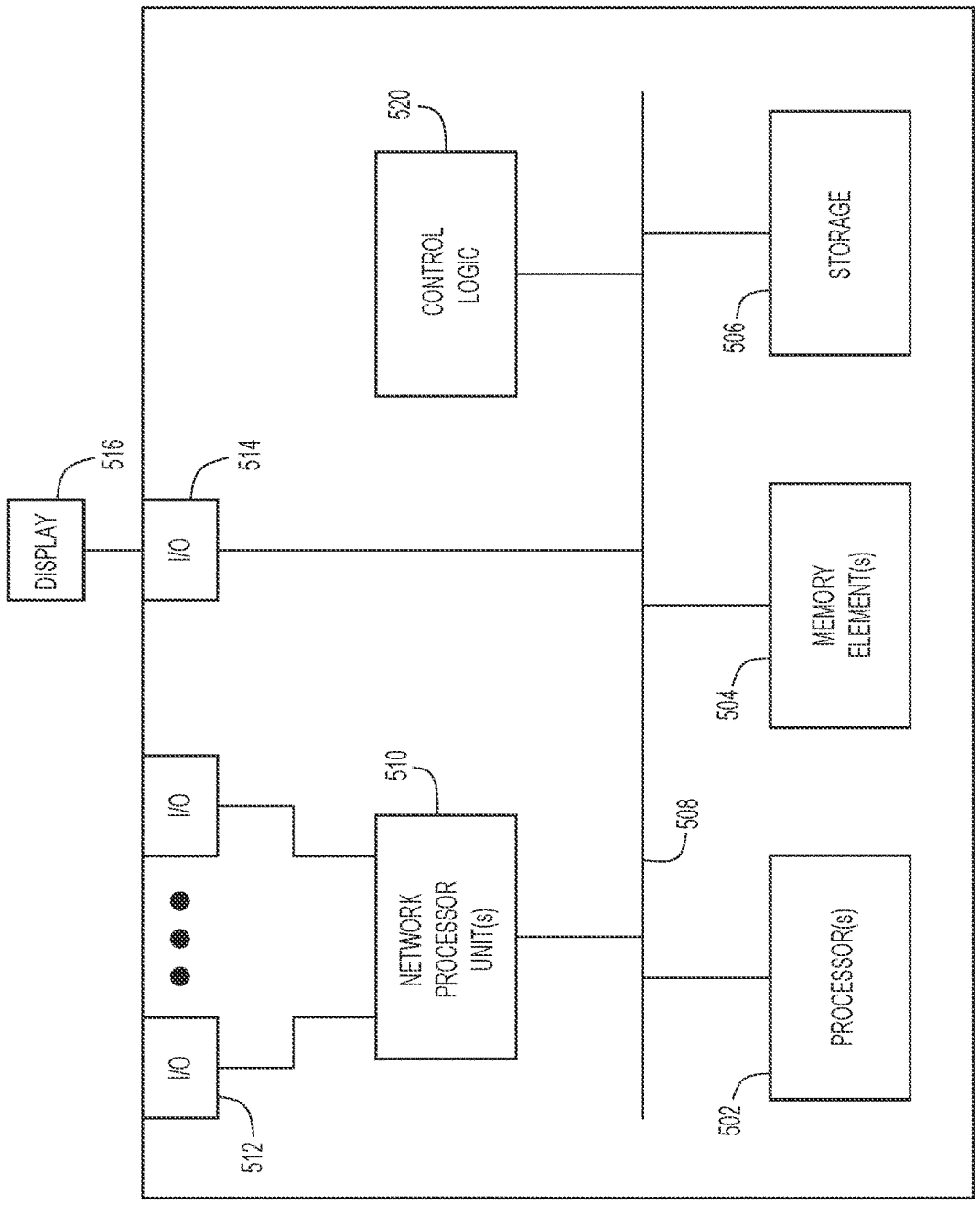
FIG. 5 is a hardware block diagram of a computing device that may perform functions associated with any combination of operations in connection with the techniques depicted and described in FIGS. 1-4, according to various example embodiments.

FIG. 5 is a hardware block diagram of a computing device 500 that may perform functions associated with any combination of operations in connection with the techniques depicted in FIGS. 1-4, according to various example embodiments, including, but not limited to, operations of the smart actioning system 120. Further, the computing device 500 may be representative of one of network devices of the external system 160 or may be a device that runs the KNative event broker 140 and/or KNative service 150. It should be appreciated that FIG. 5 provides only an illustration of one example embodiment and does not imply any limitations with regard to the environments in which different embodiments may be implemented. Many modifications to the depicted environment may be made.

In at least one example embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various example embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to the computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like, shown at 516 in FIG. 5.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided that may deploy the smart actioning system 120 or a portion thereof of FIG. 1 or the computing device 500 of FIG. 5. The apparatus includes a memory, a network interface configured to enable network communications and a processor. The processor is configured to perform various operations. The operations include obtaining data describing an open application programming interface that includes one or more cloud event definitions and application programming interface calls for integrating with an external system and generating at least one serverless workflow based on the one or more cloud event definitions. The at least one serverless workflow executes in a cloud native environment. The operations further include deploying the at least one serverless workflow in the cloud native environment for integration with the external system.

In yet another example embodiment, one or more non-transitory computer readable storage media encoded with instructions are provided. When the media is executed by a processor, the instructions cause the processor to execute a method involving obtaining data describing an open application programming interface that includes one or more cloud event definitions and application programming interface calls for integrating with an external system and generating at least one serverless workflow based on the one or more cloud event definitions. The at least one serverless workflow executes in a cloud native environment. The method further involves deploying the at least one serverless workflow in the cloud native environment for integration with the external system.

In yet another example embodiment, a system is provided that includes the device and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining at least one schema and data describing an open application programming interface (API) that includes one or more cloud event definitions and API calls for integrating with an external system;
applying the at least one schema to generate serverless workflow data based on the data describing the API;
generating, based on the one or more cloud event definitions and the serverless workflow data, at least one serverless workflow that executes in a cloud native environment and defines actions to be performed in the external system; and
deploying the at least one serverless workflow in the cloud native environment for integration with the external system.

2. The method of claim 1, wherein each of the one or more cloud event definitions includes at least one of:
a unique tag that defines a respective workflow of the at least one serverless workflow,
at least one sequence identifier which defines a state of the respective workflow,
a name of an event which defines the event of the respective workflow that triggers next state in the respective workflow,
a source of the event, and
a type of the event.

3. The method of claim 1, wherein each of the one or more cloud event definitions are defined as an x-action extension in the data describing the open API and wherein an x-action tagged resource generates a function in the at least one serverless workflow.

4. The method of claim 1, wherein:
the serverless workflow data includes cloud native computing foundation (CNCF) serverless workflow data;
the at least one schema provides a model to interpret and transform the open API to serverless workflows; and
generating includes generating the at least one serverless workflow based on the CNCF serverless workflow data to perform one or more of:
executing an action with respect to the external system, or
obtaining telemetry data from the external system.

5. The method of claim 1, further comprising:
generating a docker image based on the at least one serverless workflow; and
storing, in a docker registry, the docker image.

6. The method of claim 5, further comprising:
generating at least one service for integrating with the external system based on the docker image.

7. The method of claim 1, wherein deploying the at least one serverless workflow includes:
executing at least one service that performs at least one API call to the external system and that obtains at least one event from the external system.

8. The method of claim 1, wherein:
the serverless workflow data includes one or more states that are triggered by events occurring in the external system and operations that are to be performed at each state.

9. An apparatus comprising:
a memory;
a network interface configured to enable network communications; and
a processor, wherein the processor is configured to perform operations comprising:
obtaining at least one schema and data describing an open application programming interface (API) that includes one or more cloud event definitions and API calls for integrating with an external system;
applying the at least one schema to generate serverless workflow data based on the data describing the API;
generating, based on the one or more cloud event definitions and the serverless workflow data, at least one serverless workflow that executes in a cloud native environment and defines actions to be performed in the external system; and
deploying the at least one serverless workflow in the cloud native environment for integration with the external system.

10. The apparatus of claim 9, wherein each of the one or more cloud event definitions includes at least one of:
a unique tag that defines a respective workflow of the at least one serverless workflow,
at least one sequence identifier which defines a state of the respective workflow,
a name of an event which defines the event of the respective workflow that triggers next state in the respective workflow,
a source of the event, and
a type of the event.

11. The apparatus of claim 9, wherein each of the one or more cloud event definitions are defined as an x-action extension in the data describing the open API and wherein an x-action tagged resource generates a function in the at least one serverless workflow.

12. The apparatus of claim 9, wherein:

the serverless workflow data includes cloud native computing foundation (CNCF) serverless workflow data;

the at least one schema provides a model to interpret and transform the open API to serverless workflows; and the processor is configured to perform generating by generating the at least one serverless workflow based on the CNCF serverless workflow data to perform one or more of:

executing an action with respect to the external system, or obtaining telemetry data from the external system.

13. The apparatus of claim 9, wherein the processor is further configured to perform additional operations comprising:

generating a docker image based on the at least one serverless workflow; and storing, in a docker registry, the docker image.

14. The apparatus of claim 13, wherein the processor is further configured to perform an additional operation comprising:

generating at least one service for integrating with the external system based on the docker image.

15. The apparatus of claim 9, wherein the processor is further configured to deploy the at least one serverless workflow by:

executing at least one service that performs at least one API call to the external system and that obtains at least one event from the external system.

16. One or more non-transitory computer readable storage media encoded with instructions that, when executed by a processor, cause the processor to execute a method comprising:

obtaining at least one schema and data describing an open application programming interface (API) that includes one or more cloud event definitions and API calls for integrating with an external system;

applying the at least one schema to generate serverless workflow data based on the data describing the API;

generating, based on the one or more cloud event definitions and the serverless workflow data, at least one serverless workflow that executes in a cloud native environment and defines actions to be performed in the external system; and deploying the at least one serverless workflow in the cloud native environment for integration with the external system.

17. The one or more non-transitory computer readable storage media of claim 16, wherein each of the one or more cloud event definitions includes at least one of:

a unique tag that defines a respective workflow of the at least one serverless workflow, at least one sequence identifier which defines a state of the respective workflow, a name of an event which defines the event of the respective workflow that triggers next state in the respective workflow, a source of the event, and a type of the event.

18. The one or more non-transitory computer readable storage media of claim 16, wherein each of the one or more cloud event definitions are defined as an x-action extension in the data describing the open API and wherein an x-action tagged resource generates a function in the at least one serverless workflow.

19. The one or more non-transitory computer readable storage media of claim 16, wherein:

the serverless workflow data includes cloud native computing foundation (CNCF) serverless workflow data;

the at least one schema provides a model to interpret and transform the open API to serverless workflows; and generating includes generating the at least one serverless workflow based on the CNCF serverless workflow data to perform one or more of:

executing an action with respect to the external system, or obtaining telemetry data from the external system.

20. The one or more non-transitory computer readable storage media of claim 16, wherein the method further comprises:

generating a docker image based on the at least one serverless workflow; and storing, in a docker registry, the docker image.

\* \* \* \* \*